United States Patent Office 3,224,094
Patented Dec. 21, 1965

3,224,094
POLYETHYLENE COATED BLADES AND PROCESS
FOR THEIR PRODUCTION
Pascal Eugene Esemplare, Roselle Park, N.J., assignor to
Philip Morris Incorporated, New York, N.Y., a corporation of Virginia
No Drawing. Filed Oct. 4, 1962, Ser. No. 228,275
6 Claims. (Cl. 30—346)

This invention relates to polyethylene coated blades and to a process for their production. More particularly, the present invention relates to polyethylene coated razor blades and to a process for their production.

In addition to the usual problems involved in maintaining a sharp edge on the blades during extended storage periods and through repeated use, cutting blades which are employed for certain uses have presented additional problems. For example, cutting blades which are used for shaving hair involve the problems of the pull of the blade on the hairs, the effect of the blade action on the skin, as well as the overall ease with which such shaving can be accomplished.

In order to lessen some of the undesirable effects which occur during the use of cutting blades, various lubricants have been utilized. For example, blades have been coated with oil in order to use them in many applications. In addition, shaving preparations, such as shaving soaps and the like, have been employed to provide improved performance when blades have been used for shaving purposes. Furthermore, blade edges have been made sharper for greater cutting ease and blades have been developed of metals which will hold a sharper edge for longer periods of time. Blades have also been made of metals which will resist attack by air and various liquids which cause the degradation of the blade.

Some coatings have been developed to provide blades with a degree of protection against air and liquids which attack them. For example, wax coatings have been applied to steel blades to prevent the blades from rusting due to the action of water. In addition, certain materials have been applied to blades in order to facilitate shaving with them. Such materials have included silicone coatings and halogenated hydrocarbon coatings. However, none of the materials developed to date has completely satisfied all of the requirements of a good cutting blade, particularly where the cutting blade is to be employed for shaving.

The present invention provides a coated blade which is an improvement over the blades now known in the art. Blades which are coated in accordance with the present invention, when used for shaving, provide: excellen shavability, readily shaving hair with essentially no pull on the hair and no irritation or pull on the skin; superior durability, permitting a large number of shaves per blade; and good storage properties, remaining in storage long periods of time without deteriorating or losing their sharpness. In addition, they can be manufactured simply and are made of mterials which are both readily available and inexpensive.

In accordance with the present invention, cutting blades, particularly razor blades, are coated with a polyethylene resin.

The blades which may be coated in accordance with the present invention may include single and double edge razor blades, made for example of hardenable stainless steel or of carbon steel, surgical instruments, scissor blades, knife blades and the like.

A preferred preliminary step involves first cleaning the blades with a solvent which will dissolve grease, for example trichloroethylene, carbon tetrachloride, chloroform, trichloroethane, perchloroethylene, to remove grease, dirt and the like. This can be done, for example, by dipping the blades in the solvent, by washing the blades with the solvent, by spraying the blades with the solvent, or buy ultrasonic solvent cleaning.

The polyethylene coating can be applied to the blades by dipping, spraying, brushing or the like, employing, for example, an emulsion, suspension or solution of the polyethylene resin with a suitable liquid. Suitable liquids to dissolve the polyethylene resin for this use include carbon tetrachloride, benzene, toluene, xylene, amyl acetate, trichloroethylene, tetrachloroethylene, hexachlorobutadiene, methylcyclohexanone, petroleum ether, turpentine, naphtha and the like. The polyethylene resin can be dissolved in the temperature range of 140–300° F. and applied to the blades in this same temperature range. Preferably, it is applied at a temperature of 245–265° F.

Suitable liquids for emulsification or suspension of polyethylene include water, and other non-solvents. The emulsified or suspended polyethylene can be applied at room temperature or at a temperature in the range of 80–200° F. Preferably, in the temperature range of 100–120° F. The blades may be at room temperature when coated with the polyethylene resin coating or may be at a temperature of from 80 to 200° F. Preferably, they are at a temperature of 180 to 200° F.

After the blades have been coated with the polyethylene resin, they are heated, for example, in an oven, to a temperature of 275 to 325° F. for a period of 2 to 10 minutes. Preferably, the heating is continued at a temperature of 295 to 305° F. for a period of 3 to 5 minutes.

The resulting coatings will generally have a thickness of from about .05 to 50 microns.

Polyethylene resins which can be employed in accordance with this invention are preferably employed per se. However, the ethylene polymer may contain percentages up to 50 percent by weight of the ethylene, of other olefinic or vinyl monomers. For example, the polyethylene resin may be in the form of a copolymer of ethylene and, up to 50 percent by weight of the ethylene of an olefinic or vinyl monomer such as propylene, vinyl chloride, vinyl acetate, vinylidene chloride, methyl methacrylate, acrylonitrile, butadiene, maleic anhydride, and butene. The polyethylene resin may also be present in admixture with up to 50 percent by weight of other polymers, which are compatible with polyethylene, such as polypropylene, polyisobutylene, polyvinyl isobutyl ether, polyvinyl acetate and polyvinyl chloride. As used herein "polyethylene" means an ethylene homopolymer and the term "polyethylene resin" includes homopolymers of ethylene as well as copolymers and admixtures of ethylene with up to 50 percent by weight, based on the ethylene, of other olefinic or vinyl monomers.

The molecular weight of the polyethylene resin employed may vary from as low as 1,000 to as high as 2,000,000 or more as determined by methods common to the art such as intrinsic viscosity or melt viscosity. The essential requirement of the polyethylene is that it be substantially solid at room temperature and up to temperatures of 150° F. Polyethylenes having densities as low as .921 and as high as .95 (ASTM method D1505–60T) have been successfully employed and densities as low as 0.910 and as high as 0.97 will be satisfactory for use in the present invention.

A particularly effective embodiment of the present invention comprises coating blades with a polyethylene coating which comprises a polyethylene resin and a polytetrafluoroethylene resin. This embodiment of my invention represents an improvement over coatings comprised solely of an ethylene resin, in that it provides improved shaving properties when used as a coating on razor blades and provides greater durability and effective life of blades which are coated with it.

The polytetrafluoroethylene resins which may be employed in the present invention are prepared by the polymerization of tetrafluoroethylene in a manner well known in the art and may have an average molecular weight of from about 300,000 to 9,000,000 and preferably from about 2,000,000 to 3,000,000.

The polytetrafluoroethylene resin is preferably employed in the form of a suspension or dispersion of minute particles having a size of from 0.1 to 0.3 micron in diameter. The polytetrafluoroethylene resin may be suspended or dispersed directly in either a polyethylene resin solution, emulsion or suspension or in a separate liquid, which serves as a suspending or emulsifying agent for the polytetrafluoroethylene resin alone.

The suspending or emulsifying agent for the polytetrafluoroethylene resin can be water or any of the organic solvents, suspending or emulsifying agents which are suitable for a polyethylene resin.

In the case of all of the resin coatings of the present invention, they can include a variety of additional materials, such as solvents, emulsifiers, plasticizers, lubricants and the like, without departing from the spirit of the invention.

In one method of preparing the coating compositions of the preferred form of the invention, polyethylene is prepared as an emulsion and the polytetrafluoroethylene resin is prepared as a dispersion which is miscible with the emulsion. The combined dispersion and emulsion are then employed as the coating solution and the blades are coated therewith in a manner to completely coat them or, if desired, to coat only the edges thereof. If the coating is applied to the entire blade, which is the preferred method of applying the coating, it provides a protective layer on the entire blade to give resistance to attack by corrosive and other elements as well as to provide a lubricating coating for the cutting portions of the blade. After this coating has been applied, the coated blade is then heated as described above.

The following examples are illustrative.

*Example 1*

Ten grams of polyethylene having a molecular weight of 1,500 and 2.5 grams of lanolin were dissolved in 290 grams of xylene and the resulting mixture was brought to the boiling point. Ten commercially available uncoated single edge blades were degreased by dipping them in a trichloroethylene solution. Five of the blades were then dipped in the boiling solution of polyethylene for a period of 5 seconds. The remaining five blades were kept as uncoated control blades. Both the coated and the uncoated blades were then placed in an oven, maintained at 300° F. and were kept there for a period of 3 minutes, after which time they were removed and allowed to cool to room temperature. Both the coated and the uncoated blades were then tested by a shaving panel for shavability, durability, ease of shaving, and smoothness, and were examined to determine their appearance as follows: The blades were viewed under a high powered microscope for coating uniformity, consistency and concentration.

The coated blades were found to have the following appearance and were preferred by the shaving panel over the uncoated blades for the following reasons: The microscopic grooves in the edge of the blade were filled in with resin giving a smooth edge. The blades gave a smoother shave than an uncoated blade, i.e. there was less tendency for the blade to pull and the result was a much more comfortable and quicker shave compared to an uncoated blade.

*Example 2*

Ten grams of polyethylene having a molecular weight of 1,500 were dissolved in 290 grams of xylene and the resulting mixture was brought to the boiling point. Ten commercially available uncoated standard single edge injector safety razor blades of hardened carbon steel were degreased by dipping them in a trichloroethylene solution. Five of the blades were then dipped into the solution of polyethylene maintained at 250° F. for a period of 5 seconds. The remaining five blades were kept as uncoated control blades. Both the coated and the uncoated blades were then placed in an oven, maintained in 300° F. and were kept there for a period of 3 minutes, after which time they were removed and allowed to cool to room temperature. Both the coated and the uncoated blades were then tested by a shaving panel for shavability, durability, ease of shaving, and smoothness, and were examined to determine their appearance as follows: The blades were viewed under a high powered microscope for coating uniformity, consistency and concentration.

The coated blades were found to have the following appearance and were preferred by the shaving panel over the uncoated blades for the following reasons: The microscopic grooves in the edge of the blade were filled in with resin giving a smooth edge. The blades gave a smoother shave than an uncoated blade, i.e. there was less tendency for the blade to pull and the result was a much more comfortable and quicker shave compared to an uncoated blade.

*Example 3*

Ten grams of polyethylene having a molecular weight of 1,500 and 4 grams of petrolatum were dissolved in 290 grams of xylene and the resulting mixture was brought to the boiling point. Ten uncoated standard single edge injector safety razor blades of hardened carbon steel were degreased by dipping them in a trichloroethylene solution. Five of the blades were then dipped in the boiling solution of polyethylene for a period of 5 seconds. The remaining five blades were kept as uncoated control blades. Both the coated and the uncoated blades were then placed in an oven, maintained in 300° F. and were kept there for a period of 3 minutes, after which time they were removed and allowed to cool to room temperature. Both the coated and the uncoated blades were then tested by a shaving panel for shavability, durability, ease of shaving, and smoothness, and were examined to determine their appearance as follows: The blades were viewed under a high powered microscope for coating uniformity, consistency and concentration.

The coated blades were found to have the following appearance and were preferred by the shaving panel over the uncoated blades for the following reasons: The microscopic grooves in the edge of the blade were filled in with resin giving a smooth edge. The blades gave a smoother shave than an uncoated blade, i.e. there was less tendency for the blade to pull and the result was a much more comfortable and quicker shave compared to an uncoated blade.

*Example 4*

In this example, polyethylene was used in combination with polytetrafluoroethylene. The polyethylene was employed as an emulsion which was miscible with a polytetrafluoroethylene dispersion to produce a coating comprised of particles of polytetrafluoroethylene embedded in polyethylene. Polyethylene, having a molecular weight of 2,000 was emulsified as follows:

Two hundred grams of polyethylene were admixed with 40 grams of oleic acid and the mixture was heated to a temperature of 230° F. 40 grams of N-methyl morpholine was then added to the mixture while stirring the mixture, which was maintained at 230° F. Seven hundred thirty grams of water was heated to a temperature of 203–210° F. and the above prepared polyethylene mixture was added slowly to the water, while stirring and while the water was maintained at a temperature of 203–210° F. The resulting emulsion had a total solids content of approximately 23.5%, of which approximately 20% was polyethylene.

Twenty grams of the above-described polyethylene emulsion was then admixed with 155 grams of water and 20 grams of an aqueous dispersion, containing 60% by weight of polytetrafluoroethylene. Five uncoated standard single edge injector safety razor blades of hardened carbon steel which had been degreased by dipping them in a trichloroethylene solution, were dipped into this mixture of an emulsion and a dispersion, which was maintained at a temperature of 150° F., and the coated blades were then heated in an oven for 5 minutes at a temperature of 250° F., together with 5 similarly degreased but uncoated control blades of the same stock. All blades were then removed from the oven and allowed to cool to room temperature. Both the coated and the uncoated blades were then tested by a shaving panel for shavability, durability, ease of shaving, and smoothness, and were examined to determine their appearance as follows: The blades were viewed under a high powered microscope for coating uniformity, consistency and concentration.

In this example, the polyethylene resin serves a twofold purpose; first, it serves to smooth out the edge of the blade by filling in the microscopic grooves and second, it serves as a binder for the discrete particles of polytetrafluoroethylene which, during the shaving operation, act as minute lubricating particles on which the blade can ride, permitting an extremely comfortable shave. The shaving panel results indicated a unanimous preference for blades coated in this manner over uncoated blades of the same type.

Example 5

In this example polyethylene was used in combination with polytetrafluoroethylene. The polyethylene was employed as an emulsion which was miscible with a polytetrafluoroethylene dispersion to produce a coating comprised of particles of polytetrafluoroethylene embedded in polyethylene. Polyethylene, having a molecular weight of 2,000 was emulsified as follows:

Two hundred grams of polyethylene were admixed with 40 grams of oleic acid and the mixture was heated to a temperature of 300°. 40 grams of N-methyl morpholine was then added to the mixture while stirring the mixture, which was maintained at 300° F. Seven hundred thirty grams of water were heated to a temperature 203–210° F. and the above prepared polyethylene mixture was added slowly to the water, while stirring and while the water was maintained at a temperature of 203–210° F. The resulting emulsion had a total solids content of approximately 23.5%, of which approximately 20% was polyethylene.

Twenty grams of the above-described polyethylene emulsion was then admixed with 155 grams of water and 20 grams of an aqueous dispersion, containing 60% by weight of polytetrafluoroethylene. Five uncoated standard single edge injector safety razor blades of handened carbon steel which had been degreased by dipping them in a trichloroethylene solution, were dipped into this mixture of an emulsion and a dispersion, which was maintained at a temperature of 150° F., and then coated blades were then heated in an oven for 5 minutes at a temperature of 300° F., together with 5 similarly degreased but uncoated control blades of the same stock. All blades were then removed from the oven and allowed to cool to room temperature. Both the coated and the uncoated blades were then tested by a shaving panel for shavability, durability, ease of shaving, and smoothness, and were examined to determine their appearance as follows: The blades were viewed under a high powered microscope for coating uniformity, consistency and concentration.

In this example, the polyethylene resin serves a twofold purpose; first, it serves to smooth out the edge of the blade by filling in the microscopic grooves and second, it serves as a binder for the discrete particles of polytetrafluoroethylene which, during the shaving operation, act as minute lubricating particles on which the blade can ride, permitting an extremely comfortable shave. The shaving panel results indicated a unanimous preference for blades coated in this manner over uncoated blades of the same type.

Example 6

In this example, polyethylene was used in combination with polytetrafluoroethylene. The polyethylene was employed as an emulsion which was miscible with a polytetrafluoroethylene dispersion to produce a coating comprised of particles of polytetrafluoroethylene embedded in polyethylene. Polyethylene, having a molecular weight of 2,000 was emulsified as follows:

Two hundred grams of polyethylene were admixed with 40 grams of oleic acid and the mixture was heated to a temperature of 220° F. 40 grams of N-methyl morpholine was then added to the mixture while stirring the mixture, which was maintained at 220° F. Seven hundred thirty grams of water were heated to a temperature 203–210° F. and the above prepared polyethylene mixture was added slowly to the water, while stirring and while the water was maintained at a temperature of 203–210° F. The resulting emulsion had a total solids content of approximately 23.5%, of which approximately 20% was polyethylene.

Twenty grams of the above-described polyethylene emulsion was then admixed with 310 grams of water and 20 grams of an aqueous dispersion, containing 60% by weight of polytetrafluoroethylene. Five uncoated standard single edge injector safety razor blades of hardened carbon steel which had been degreased by dipping them in a trichloroethylene solution, were dipped into this mixture of an emulsion and a dispersion, which was at room temperature of 150° F., and the coated blades were then heated in an oven for 10 minutes at a temperature of 220° F., together with 5 similarly degreased but uncoated control blades of the same stock. All blades were then removed from the oven and allowed to cool to room temperature. Both the coated and the uncoated blades were then tested by a shaving panel for shavability, durability, ease of shaving, and smoothness, and were examined to determine their appearance as follows: The blades were viewed under a high powered microscope for coating uniformity, consistency and concentration.

In this example, the polyethylene resin serves a twofold purpose; first, it serves to smooth out the edge of the blade by filling in the microscopic grooves and second, it serves as a binder for the discrete particles of polytetrafluoroethylene which, during the shaving operation, act as minute lubricating particles on which the blade can ride, permitting an extremely comfortable shave. The shaving panel results indicated a unanimous preference for blades coated in this manner over uncoated blades of the same type.

Example 7

Polyethylene having a molecular weight of 2,000 was emulsified as follows:

100 grams of the polyethylene was melted and 20 grams of oleic acid were added at a temperature of 212–302° F. The resulting melt was then maintained at a temperature of 248–266° F. when 20 grams of morpholine were added. The temperature of the resulting mix was then maintained at 230–239° F. The resulting polyethylene mixture was added slowly over the course of 3 to 5 minutes to hot water, 400 grams, maintained at 203–208° F. The resulting mixture was then allowed to cool with stirring.

Twenty-five grams of the polyethylene emulsion prepared above was admixed with 20 grams of a 60% polytetrafluoroethylene dispersion and 310 grams of water. Five uncoated standard single edge injector safety razor blades of hardened carbon steel which had been degreased by dippnig them in a trichloroethylene solution, were dipped into this mixture of an emulsion and a dispersion, which was at room temperature and the coated blades were then heated in an oven for 15 minutes at a temperature of 220° F., together with 5 similarly degreased but uncoated control blades of the same stock. All blades were the removed from the oven and allowed to cool to room temperature. Both the coated and the uncoated blades were then tested by a shaving panel for shavability, durability, ease of shaving, and smoothness, and were examined to determine their appearance as follows: The blades were viewed under a high powered microscope for coating uniformity, consistency and concentration.

The coated blades were found to have the following appearance and were preferred by the shaving panel over the uncoated blades for the following reasons: The microscopic grooves in the edge of the blade were filled in with resin giving a smooth edge. The blades gave a smoother shave than an uncoated blade, i.e. there was less tendency for the blade to pull and the result was a much more comfortable and quicker shave compared to an uncoated blade.

I claim:

1. A razor blade having on its cutting edge an adherent coating of a polyethylene resin in which particles of a polytetrafluoroethylene resin are suspended, the ratio of polyethylene to polytetrafluoroethylene resins in the coating being between about 0.4:1 and 1:1.

2. A razor blade having on its cutting edge an adherent coating of a polyethylene resin in which particles of a polytetrafluoroethylene resin are suspended, the ratio of polyethylene to polytetrafluoroethylene resins in the coating being between about 0.4:1 and 0.5:1.

3. A process for coating a razor blade having a cutting edge which comprises applying to the cutting edge of said blade a mixture of polyethylene and particles of polytetrafluoroethylene, the ratio of polyethylene to polytetrafluoroethylene in said mixture being between 0.4:1 and 1:1, to coat at least the cutting edge of said blade with said mixture, subjecting the resulting coated blade to a temperature of from about 275 to about 325° F. for a period of from about 2 to about 10 minutes and permitting the resulting coated blade to cool to room temperature.

4. A process for coating a razor blade having a cutting edge which comprises applying to the cutting edge of said blade a mixture comprising a solution of polyethylene and a dispersion of polytetrafluoroethylene, the ratio of polyethylene to polytetrafluoroethylene in said mixture being between 0.4:1 and 1:1, at a temperature of from about 140 to about 300° F. to coat at least the cutting edge of said blade with said mixture, subjecting the resulting coated blade to a temperature of from about 275 to about 325° F. for a period of from about 2 to about 10 minutes and permitting the resulting coated blade to cool to room temperature.

5. A process for coating a razor blade having a cutting edge which comprises aplying to the cutting edge of said blade a mixture comprising an emulsion of polyethylene and a dispersion of polytetrafluoroethylene, the ratio of polyethylene to polytetrafluoroethylene in said mixture being between 0.4:1 and 1:1, at a temperature of from about 80 to about 200° F. to coat at least the cutting edge of said blade with said mixture, subjecting the resulting coated blade to a temperature of from about 275 to about 325° F. for a period of from about 2 to about 10 minutes and permitting the resulting coated blade to cool to room temperature.

6. A process for coating a razor blade having a cutting edge which comprises applying to the cutting edge of said blade a mixture comprising a suspension of polyethylene and a dispersion of polytetrafluoroethylene, the ratio of polyethylene to polytetrafluoroethylene in said mixture being between 0.4:1 and 1:1, at a temperature of from about 80 to about 200° F. to coat at least the cutting edge of said blade with said mixture, subjecting the resulting coated blade to a temperture of from about 275 to about 325° F. for a period of from about 2 to about 10 minutes and permitting the resulting coated blade to cool to room temperature.

References Cited by the Examiner

UNITED STATES PATENTS

| | | | |
|---|---|---|---|
| 2,562,117 | 7/1951 | Osdal | 117—132 |
| 2,681,324 | 6/1954 | Hochberg | 260—45.5 |
| 2,951,047 | 8/1960 | Lantos | 260—45.5 |
| 3,071,856 | 1/1963 | Fischbein | 117—132 |
| 3,071,858 | 1/1963 | Alter | 117—161 |

FOREIGN PATENTS 605,577  6/1961  Belgium.

RICHARD D. NEVIUS, *Primary Examiner.*

WILLIAM D. MARTIN, *Examiner.*